United States Patent [19]

Barsellotti

[11] 4,096,359

[45] Jun. 20, 1978

[54] KEY TELEPHONE SYSTEM INTERCONNECTION APPARATUS

[75] Inventor: John Anthony Barsellotti, Guelph, Canada

[73] Assignee: International Standard Electric Corporation, New York, N.Y.

[21] Appl. No.: 731,710

[22] Filed: Oct. 12, 1976

[51] Int. Cl.² .............................................. H04Q 1/02
[52] U.S. Cl. ........................................ 179/99; 179/98
[58] Field of Search ............... 179/98, 99, 91 R, 1 PC

[56] References Cited

U.S. PATENT DOCUMENTS

| 3,573,373 | 4/1971 | Mullin et al. | 179/98 |
|---|---|---|---|
| 3,660,611 | 5/1972 | Knollman et al. | 179/99 |
| 3,869,582 | 3/1975 | Humphrey et al. | 179/98 |
| 3,980,834 | 9/1976 | Akiyama et al. | 179/98 |
| 4,018,997 | 4/1977 | Hoover et al. | 179/98 |

Primary Examiner—Kathleen H. Claffy
Assistant Examiner—Gerald L. Brigance
Attorney, Agent, or Firm—James B. Raden; Marvin M. Chaban

[57] ABSTRACT

Disclosed is apparatus for providing a completely flexible arrangement for relating key telephone lines to stations and to provide special features as desired to selected stations and lines. A patch or jack panel is provided with appearances for each station and for each line or trunk. Interconnect or cross connect cords or cables may be secured between stations and lines to provide line appearances at the respective stations for each cross-connection made. Further provisions are made for providing line to station ringing on selected lines under power failure conditions and for providing selected class of service for selected lines. Use of this apparatus allows the interconnection of lines to key appearances to be made as desired on installation of the system, on location. In addition, changes can readily be made in the interconnections whenever such changes are required.

4 Claims, 6 Drawing Figures

KEY TELEPHONE SYSTEM INTERCONNECTION APPARATUS

BACKGROUND OF THE INVENTION

In key systems as generally known, line appearances at stations are hard wired and can only be changed by disconnection of the wires, as necessary. In addition, special features are also connected permanently as necessary and changed only by laborious disconnection and replacement as has been common in the telephone industry since the inception of cross connect distribution wiring.

In the case of key systems of the type shown in U.S. Pat. No. 3,935,396 issued Jan. 27, 1976, many lines can be provided with access to stations by time division signaling methods thereby minimizing the number of conductors extending from stations to lines. In such systems, the connection of speech conductors from lines to stations through crosspoint matrices are under memory control. Larger combinations of station and line access are feasible with systems of this type. However, the requirement of inflexible permanent wiring connections inhibit the possibility of changing line to station allocations and for changing special features being provided to one or more stations.

SUMMARY OF THE INVENTION

The present invention provides an apparatus for providing a fully flexible station-line access for a key system employing a large plurality of lines having access to a key station. The apparatus allows the line to station association to be changed, if necessary, by the unplugging of panel jacks and by replugging the jacks in a different configuration. The jack and plug connections once made will determine the lines accessible at respective stations through the otherwise normal use of the key system. These connections or associations can readily be set on location by the installers, as required by conditions in what would be a permanent connection but which could readily be changed, if necessary.

In a like manner various special features such as restricted service (on a per-line basis) can be changed when necessary as well as features such as ringing of a particular line at a particular station in the event of a power failure. For a limited number of stations added features such as automatic hold, security operation, and prime line pick-up can be provided to any station by proper cross-connection of cords on the jack panel of the apparatus.

Further, stations having access to a number of lines may be readily joined to provide additional lines with access to one of the stations up to a multiple of that number of lines.

It is therefore an object of the invention to provide an improved apparatus for associating stations with lines for use in key telephone systems.

It is a further object of the invention to provide a key telephone system in which a plug-panel is provided for associating stations with lines in any pattern desired.

It is a further object of the invention to provide as an integral part of each key telephone system, a plug-in programming panel for associating stations with lines or with desired special features in a fully flexible, readily changeable arrangement.

It is a still further object of the invention to provide in a time division key telephone system, an arrangement located at the key system for associating lines with stations in a fully flexible manner.

DETAILED DESCRIPTION OF THE DRAWINGS

Figure 1A:
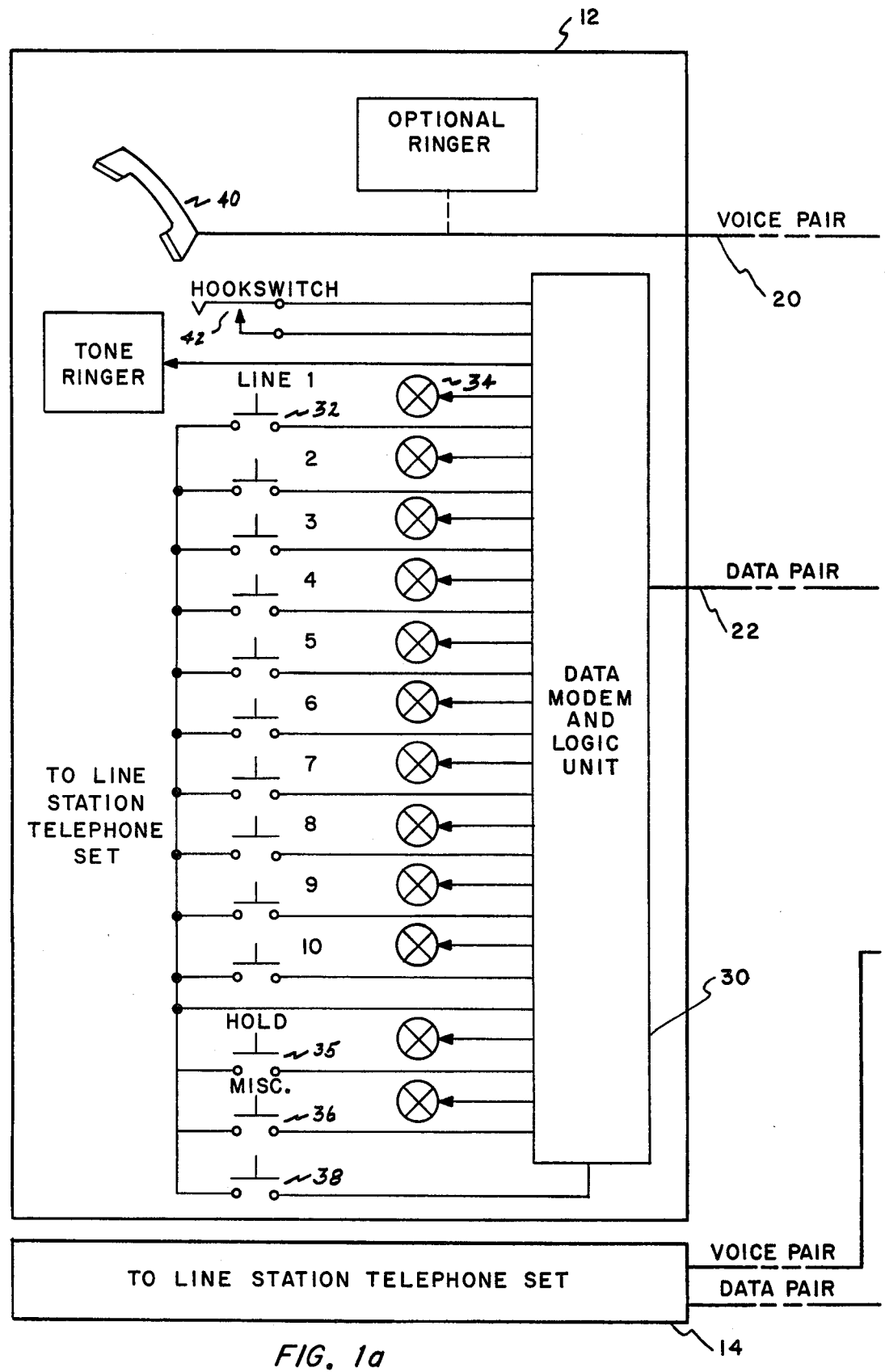
FIGS. 1, 1a, 1b, and 1c are a schematic block diagram of the circuit of a key telephone system employing my invention.
Figure 1C:
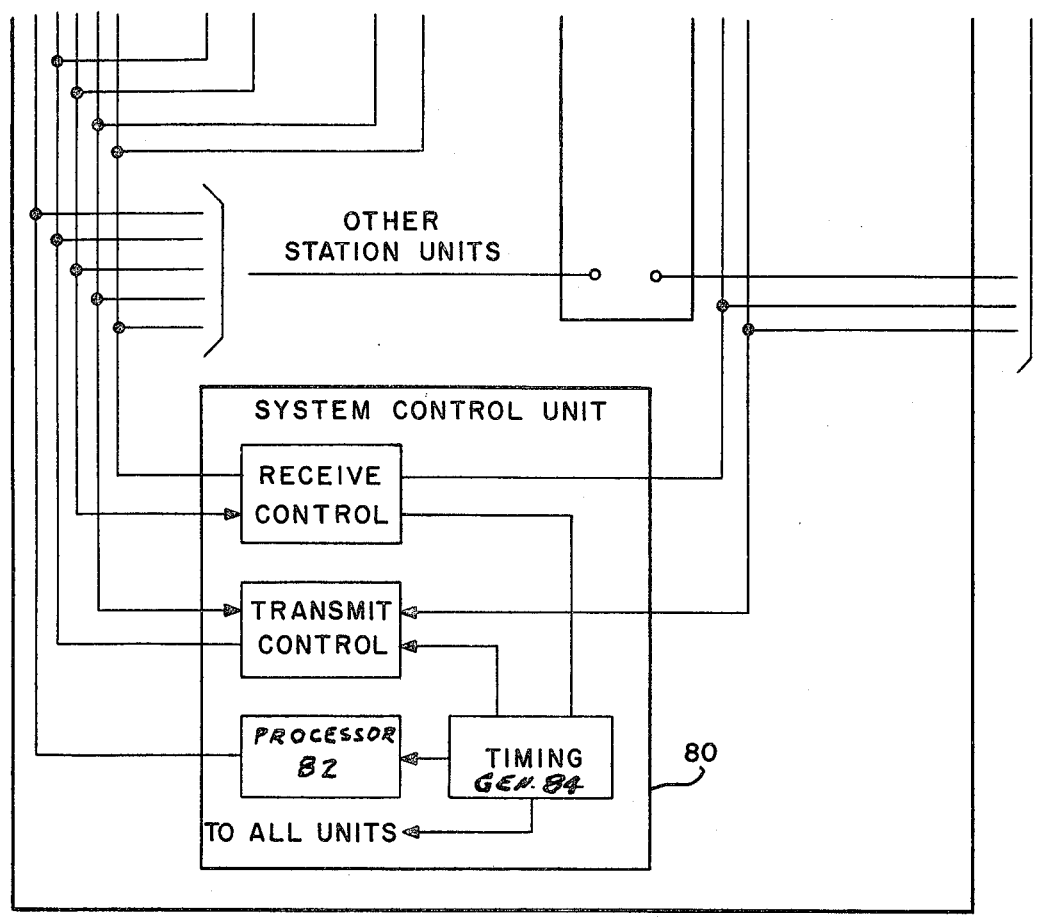
Figure 1:
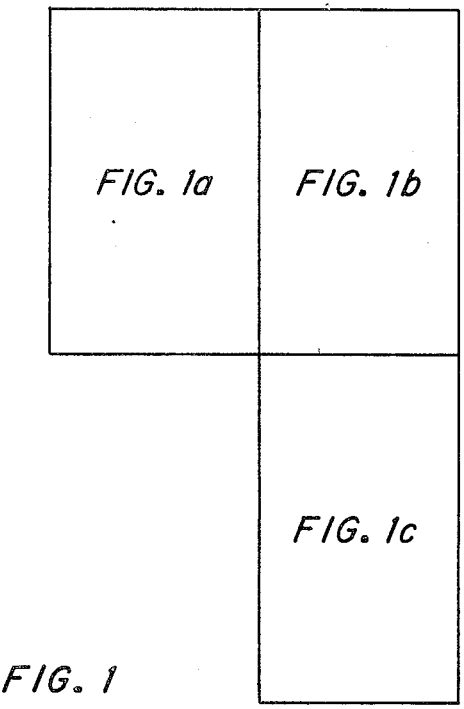
Figure 1B:
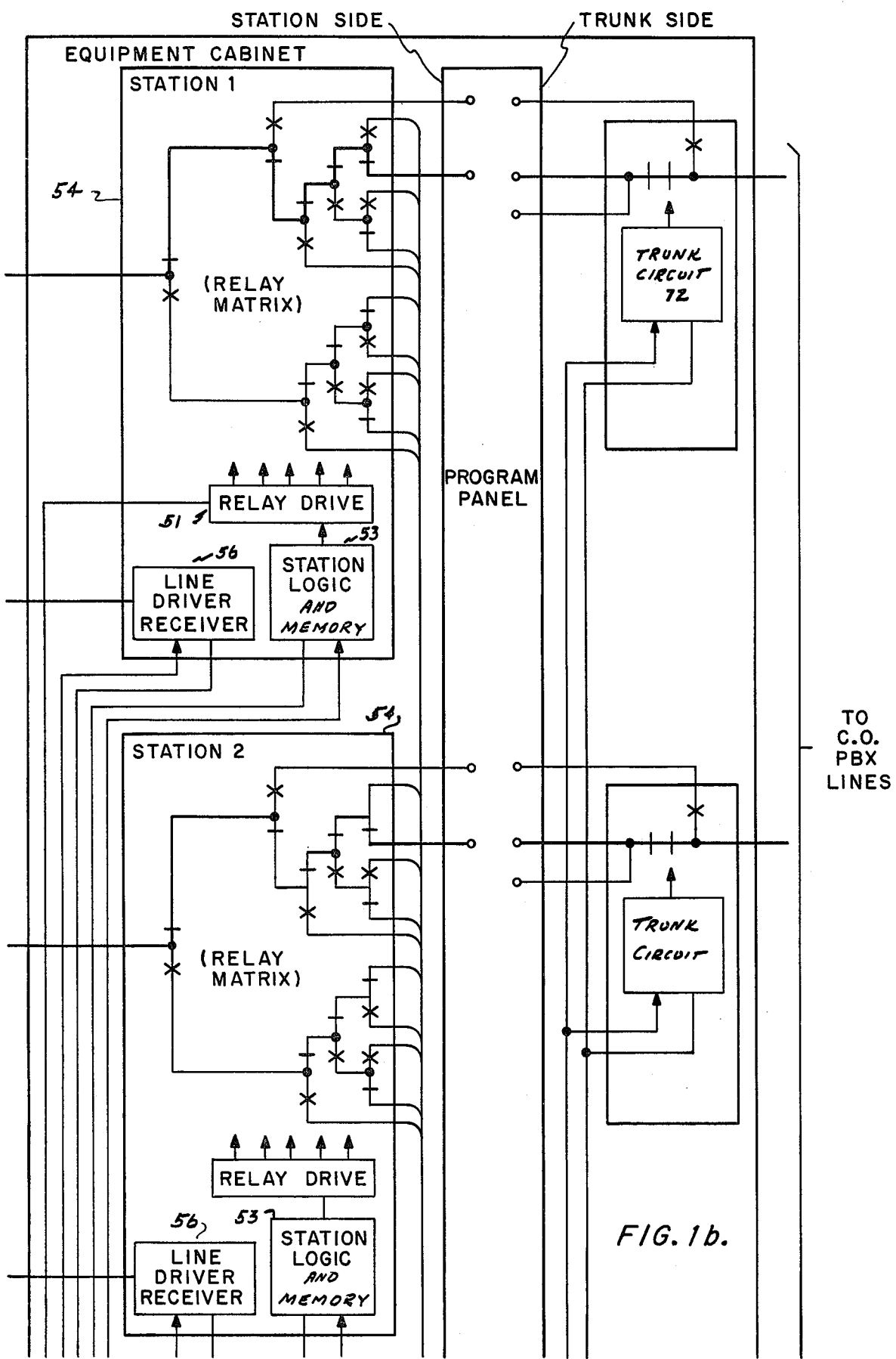

In FIG. 1, I show a block diagram for a circuit as shown by U.S. Pat. No. 3,935,396 issued Jan. 27, 1976 for a key telephone system in which there is a Key Telephone Unit (KTU) equipment cabinet serving a plurality of key telephone stations sets 12, 14 with but one voice pair of conductors 20 and one data pair of conductors 22 between the equipment cabinet and each station set such as station set 12.

Within the station set 12, there is a Data Modem and Logic Unit 30 and a plurality of line select buttons 32 and associated line lamps 34, one lamp and button per line, as is well-known. Shown is a ten-line station set with ten line buttons 32, a hold button 35, a miscellaneous services button 36 (which could be a conference button, for example) and a secrecy button 38. A telephone handset 40 is shown provided with a hookswitch 42, the hookswitch providing input to the data modem.

As mentioned, four wires (two data and two speech wires) connect the station set to the control equipment. The two wires forming the voice pair connect the telephone instrument or handset to conductors of one multiple of a relay contact matrix section 50 of a corresponding station circuit 54 of the KTU equipment cabinet. Each station is associated with a station circuit through the voice pair on the matrix and the data pair in the station control. Each matrix comprises a tree of relay contacts controlled by a plural relay drive 51, the relays being controlled from the station logic and memory 53. The two wires for the data pair connect the modem 30 in the station set to the line driver/receiver 56 in the station circuit, the station circuit being located in the equipment cabinet, as mentioned.

Within a station circuit, the relay matrix is arranged to handle up to ten lines per station in two groups of five lines each (a twenty line station is handled by grouping two station circuits together). Similarly, logic circuits at both ends of the data pair are designed to operate with groups of five lines. Processing of data is carried out on five lines at a time. If more than five lines are required at one station, multi-group operation is involved and two or more station circuits are coupled together. The same two data wires and two speech wires are used between the station and the central equipment regardless of the number of lines appearing at that station, the control of the speech pair being exercised over the data pair by time division methods.

Each line selection button at each station set is assigned to one trunk of line, at the time of installation. This assignment is set on the programming panel in the control equipment. The assignment of each button to a line is programmed by inserting a three-wire patch cord link between the station circuit and the required trunk circuit. Two of these wires are the voice pair (T & R) and the third is the data control lead (H).

Each telephone line 70 from the CO or PBX is connected to a trunk circuit 72 where it is monitored for ringing voltage. In each trunk, logic and relay control monitors and stores the status of the trunk and controls trunk conditioning features such as hold, release, etc. From the trunk, connections are made to the programming panel (trunk side) as will be explained relative to FIG. 3.

Intercom links are regarded as variations of trunks in which the power for the voice circuit is generated locally.

SYSTEM OPERATION

The system is controlled by the system control unit 80 which includes a data processor 82 and a station address generator 84. The generator 84 sequentially provides the address of each station, once per frame period (60 ms). The system capacity is 96 lines, therefore each station is addressed for a 625 μs period. This period is called a sub-frame. Each station, together with the trunks assigned to that station, is processed within its own sub-frame which re-occurs every 60 ms. This timing produces a scanning rate of 16⅔Hz. The basic timing and sequence for the system is shown in the reference patent cited.

The station circuit, when addressed, generates a "sub-scan" which provides a sequential address to each of the five trunks assignable to the station being processed. As they are addressed, the trunks transmit data which is representative of their status to the system control unit. The data indicates the trunk status such as trunk free, busy, incoming call, held, etc.

When the sub-scan is complete, the system control unit will have stored the status of each of the five lines or trunks. From this status information, a code is assembled for serial transmission to the station set data modem via the line driver/receiver within the station circuit. The transmission of the coded data, which may be in diphase form, is used to control the status display and the tone caller or ringer in the station set.

The station set data modem transmits coded data to the control equipment whenever an error-free signal is received. The coded data is encoded serially in diphase form. The coded data represents the status of the line access buttons, miscellaneous control buttons and the subset hookswitch.

The control equipment receives this coded data, decodes it and compares the data to the trunk status information stored in the system control unit. From this comparison, control codes are assembled and sent to the station and trunk circuits. The addressing is arranged so that only the trunk to which the station is presently connected (if any) will respond to the trunk control code. Typical control codes to the trunks might cause cut-through (to the station set), hold, release, change security mode, etc. The most significant control code to the station circuit is used to switch the station set voice pair to the required trunk, via the matrix within the station circuit.

The entire control sequence is repeated during every sub-frame, thus providing an update of the line status display on each station set every 60 ms. If the user wishes to select a line to make an outgoing call or to answer an incoming call, he checks the status display, then operates the required line access button. In the conventional manner, a free line will have the associated line lamp extinguished, an incoming call will have its lamp lit by a regular flash sequence, and a busy line will have a steadily lit lamp.

The identity of the requested line is sent to the control equipment over the data pair during the next regular transmission interval. After checking the validity of the line request, the system control will switch the station set voice pair to the trunk at the switching matrix and change the status of that trunk to busy. After the status change indication, as each station is processed, the status display will be updated to show that the trunk is busy.

When a station set is connected to a trunk through the switching matrix, a metallic path is completed from the station set speech pair to the CO/PBX line and dialing can be accomplished in the normal manner.

Figure 2:
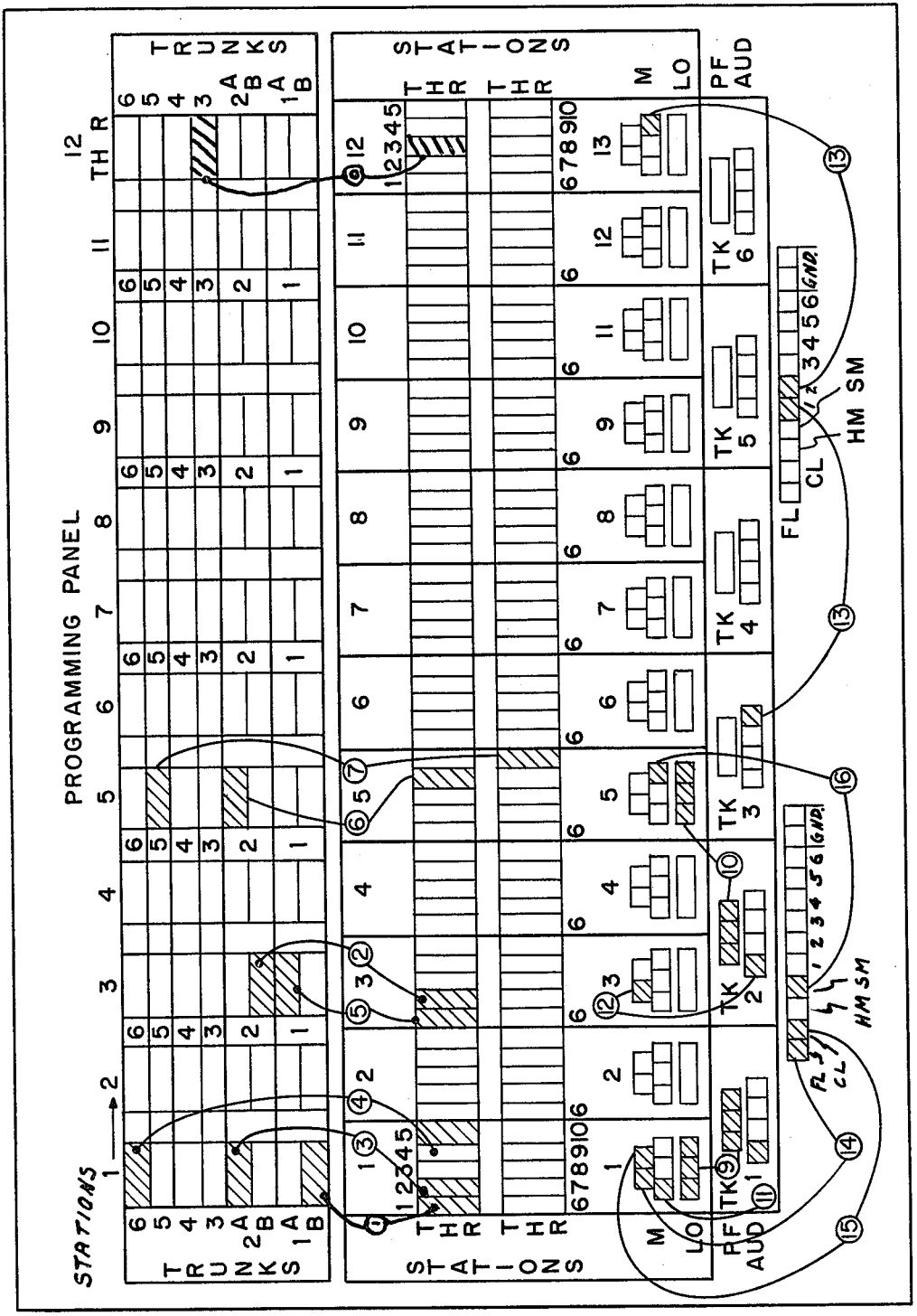
FIG. 2 is a perspective view of the equipment cabinet housing the system of FIG. 1 showing the programming panel of the invention.
Figure 3:
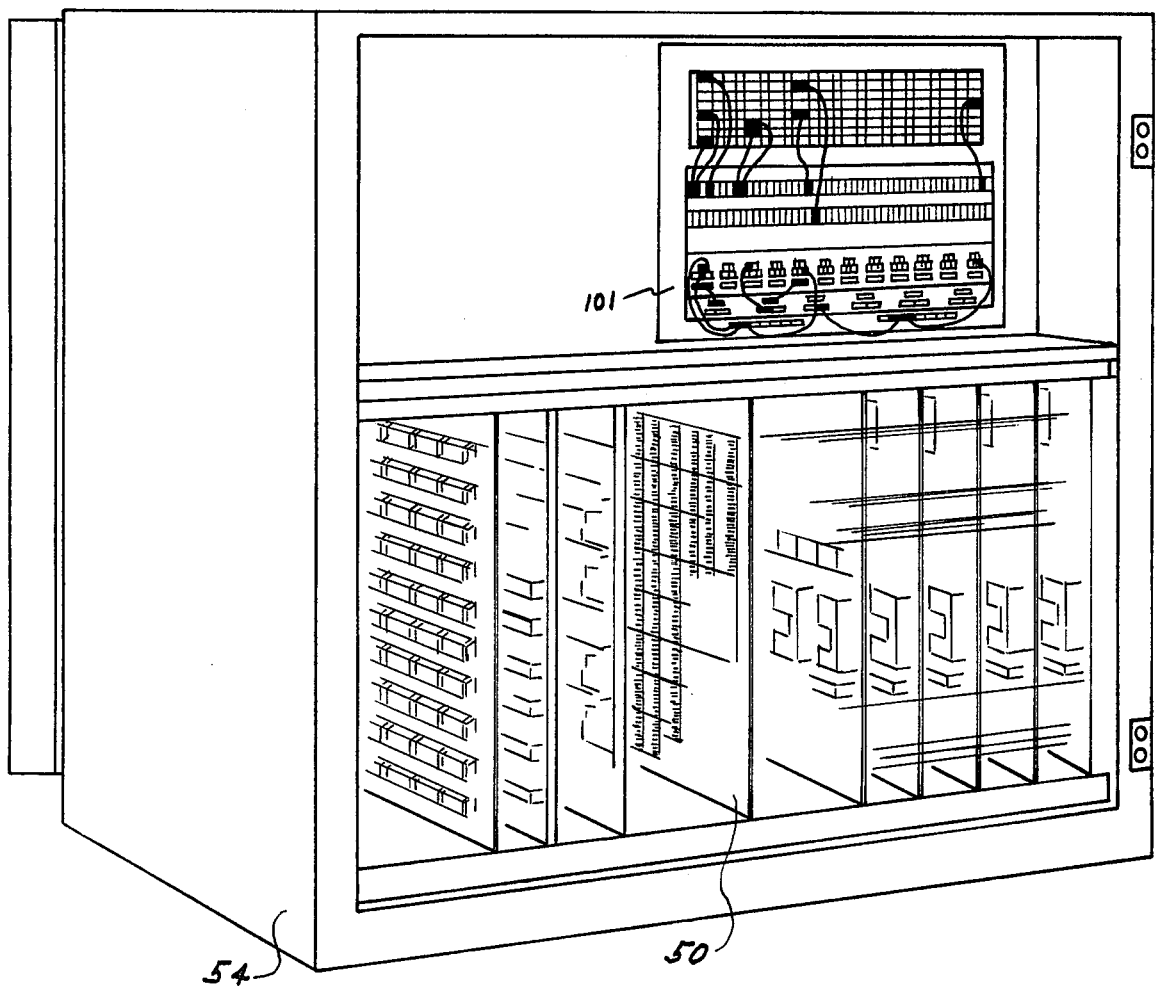
FIG. 3 is a layout drawing of the programming panel in the circuit of FIG. 1, with exemplary interconnections shown.

In FIG. 3, there can be seen a portion of the equipment cabinet 54 comprised in its lower half (not shown) of a plurality of slide-in printed circuit boards 50 containing the circuitry of the equipment cabinet shown in block form in FIG. 1. The upper half of the cabinet is faced with a structure to which is mounted the programming panel 101, as shown in greater detail in FIG. 2 which forms the substance of the present invention.

The programming panel of FIG. 2 is used to determine which station will be associated with a given line and which station or stations will operate under power failure conditions in addition to various other optional features. Depending on the size of an installation, one of the two types of programming panel will be used. For systems with 12 stations or less, the programming panel of FIG. 2 is used. For systems with up to 24 stations, a programming panel of essentially a double multiple of the panel of FIG. 2 is used. Interconnections on the panel may be made by any suitable method, the preferred mode being three wire polarized plugs or by three individual single wire plugs. Of these approaches, the use of three wire plugs is considered more expedient and trouble free. The plugs mate with and engage horizontal pins which are connected by suitable leads as shown in FIG. 1 to the operating components of the system.

Except for the number of lines to be permitted access at a station, programming panels are laid out in the same pattern as shown in FIG. 2. Two sizes may be used, a 12 station, 6 line size or a 24 station, 12 line size, each size being configured in the pattern of FIG. 2. The top portion, labeled "trunks" provides trunk appearances for six trunks for each line appearance. Some of these trunk appearances are divided into two sections labled A and B. The A connections are identical to the connections for the remaining lines, the B connections being reserved for special class of service (COS) functions.

The lower portion of the panels, labled "Stations" provides one circuit appearance for each station with access to up to ten lines per station. This part of the board also contains a circuit for each station which may be used to program that station for ringing and operation during power failure conditions. The lower section of each board is reserved for the power fail and audible signalling options. Two or four groups of appearances in a single row are also provided at the extreme bottom of the panel. These appearances provide access to such special features as free line, calling line (sometimes called prime line pick-up), hold mode, security mode. Spare appearances 1 through 6 and two ground appearances are provided in each group. The spare appearances can be used when patching from one circuit to another with short leads. All appearances 1 through 6 in each group are commoned in pairs. Methods of programming the panel for various functions are outlined next.

Each appearance or block in FIG. 2 may be a pin or may be a jack which receives the plugs and provides a connection to the circuit as seen in FIG. 1.

Line programming includes assigning a line (trunk or intercom) to a specific key telephone station and a specific line button on that telephone. This is accomplished by connecting three wire patch cords between the desired trunk and the desired station/button through the line appearance on the programming panel.

If the station is to have restricted access to the line, the trunk must be either trunk 1 or trunk 2, on the 12-station system, or one of trunks 1 through 4 on the 24 station system. In either case, the patch cord must be connected to the B position of the trunk on the programming panel. The B position gives access to Class of Service (COS) strapping on the trunk (line) card. When the B position is used, the Class of Service (COS) strapping must be installed on the trunk card.

The "A" position does not permit restricted service and is identical to the remaining trunk positions on the programming panel.

Each trunk can be patched to each station by patching from the desired station/line button representation to the desired trunk appearance. Sample connections are shown by conditions with circled indicator numbers. For example, if non-restricted service from trunk 1 to station 1, line 3, is desired; a patch cord (three conductor - T, H, R,) would be installed between trunks 1A and station 1 (connection 5 of FIG. 2). If, for example, restricted service is desired on station 2, line 3 on service from trunk 2, the patch cord or strap should be installed from trunks 2B to stations 2, 4 for the three conductors T, H and R (connection 2 of FIG. 3). In this case, additional strapping will be required on the trunk card for trunk 2.

Communications with stations in the system is possible during a power failure condition by installing power fail strapping, provided the station is equipped with a ringer; as a tone caller will not work. Each trunk can be connected to one station during power failures. To connect the power failure feature, a strap is completed from the pins designated PF TK to the LO pins of the desired station. For example, to have station 1 ring when a call arrives on line 1 during a power failure, a strap or connection is made from pins designated PF TK1 to pins designated LO of stations 1 with a three-conductor cord (connection 9 of FIG. 3).

If a 20 line subset is used, it is desirable, but not essential, that the two 10-line groups be on the same station card (each card contains circuitry for two 10 line stations). To group two stations together to make one 20 line station, three straps are required, a three conductor cord is patched from pins designated L1 of one station to pins L0 of the second station and a single conductor cord is patched from pin M and AL pin of the first station to pin M and pin AL of the second station. For example: if it is desired to make stations 1 and 2 into one 20-line station, the following straps should be installed: From Station 1, line 1 L1-Connect a three conductor cord to pins designated station 2, L0, and from pins designating station 1; M-Connect a single conductor cord to the pin designated station 2, M and from pins designated station 1; AL-Connect a single conductor cord to station 2, AL. A strip is also required on the station card.

In this example, the patching positions for station 2, buttons 1 through 10 would represent buttons 11 through 20 on the 20 line subset which is not considered as station 1. Station 2 would be non-existent.

Features such as Hold, Security and Prime Line Pick-up are programmed for the entire system in the system control unit. However, limited deviation from the system programming can be achieved via patching on the programming panel. One or two stations on a 12-station system or, up to four stations on a 24-station system, can be programmed to operate in the opposite mode to all other stations in the system.

Each station patching position on the programming panel has five pins labled "M". These can be patched, using single conductor cords, to the pins at the bottom of the panel labled FL (Free Lance), CL (Calling Line), HM (Hold Mode) and/or SM (Security Mode). When such a patch is made, the station involved will operate in the reverse mode to all other (unpatched) stations.

For example: Assume the control card to be strapped to provide for manual hold, normally non-secure, free line and calling line pick-up. In addition, assume that station 1 has four cords patched from the station M pins to HM, SM, FL and CL. In this case, station 1 will have automatic hold, security operation and no free or calling line pick (auto pre-selection). This is the reverse of all other (unpatched) stations. This patching can be applied to reverse the operation of any or all these features.

All control, storage and transmission of data is on a line basis with each line having pre-assigned time intervals in the frame sequence, thus by physically associating a plurality of stations with respective lines by cross connections at the programming panel, a fully flexible interrelation of lines and stations is possible. In a like manner, various special features can be provided to any desired station or stations within the stated capabilities.

I claim:

1. A key telephone system comprising a plurality of stations and a plurality of lines, a switching network having a plurality of input and output paths, each station having a station set with at least one alignment of manually operable keys in which each of said keys is representative of an individual one of said lines, each of said keys respectively coupled to one of said input paths to said network, said output paths comprising paths to lines of said system, the invention comprising manually replaceable distributing means for connecting input paths to output paths, said distributing means comprising a panel adjacent said switching network and including multiple conductor connector positions for each of said lines and multiple connector positions for each key of said station sets, means for selectively enabling the connection of said lines to said key positions in a manner allowing ready re-association of lines and station keys, said connecting means comprising conductors having plug-in members for joining respective selected lines to selected stations within the respective station key connector position and wherein for each of said station positions, there is an alignment of connectors for each line which could be associated with the station represented by said position and each of said station positions include a first and a second set of connectors, said first set comprising connectors for providing a predetermined class of service appearances and said second set comprising connectors without class of service restriction.

2. A system as claimed in claim 1, wherein each station position has a further set of connectors for connecting said station to enable a plurality of additional feature connections to said station connector positions by the use of further plug-in members.

3. A key telephone system comprising a plurality of stations and a plurality of lines, a switching network having a plurality of input and output paths for furthering a speech path for completion between a selected line and a selected station, each station having a station set with at least one alignment of manually operable keys in which each of said keys is representative of an individual one of said lines, each of station keys respectively coupled to one of said input paths to said network, each of said output paths comprising paths to lines of said system, distributing means for associating input paths with output paths comprising a plug board having a position for each of said stations with each of said station positions having a first set of connections to said input paths to said network and a second set of connections to said output paths, each of said connections comprising terminals for receiving patch cords of single and multiple individual conductor types for completing connections between input and output paths at a single station appearance, said board including multiple conductor appearances for each of said station sets, and appearances for each line, said board including further connector positions for connection to selected stations for special service features through additional manually replaceable patch cords.

4. A key telephone system as claimed in claim 3, wherein there is a cabinet for said system, and wherein said plug board is mounted on one face of said cabinet adjacent said switching network to allow direct connection from said board to said input and output paths.

* * * * *